United States Patent

Eskew et al.

Patent Number: 5,441,082
Date of Patent: Aug. 15, 1995

[54] CASING SPACER

[75] Inventors: Sam Eskew, Atlanta, Ga.; William L. Kane, Somonauk, Ill.

[73] Assignee: Cascade Waterworks Manufacturing Co., Yorkville, Ill.

[21] Appl. No.: 297,876

[22] Filed: Aug. 30, 1994

[51] Int. Cl.⁶ ............................................. F16L 9/18
[52] U.S. Cl. .................................. 138/112; 138/113; 138/166
[58] Field of Search ............... 138/113, 108, 112, 159, 138/168, 166, 147, 162

[56] References Cited

U.S. PATENT DOCUMENTS

| | | | |
|---|---|---|---|
| 1,931,694 | 10/1933 | Hall | 138/159 |
| 2,868,230 | 1/1959 | Stokes | 138/113 |
| 2,890,724 | 6/1959 | Kennedy, Jr. | 138/113 |
| 2,896,669 | 7/1959 | Broadway et al. | 138/113 |
| 2,938,569 | 5/1960 | Goodrich | 138/113 |
| 3,540,487 | 11/1970 | LoRusso | 138/112 |
| 4,182,378 | 1/1980 | Dieter | 138/112 |
| 4,280,535 | 7/1981 | Willis | 138/112 |
| 4,455,112 | 6/1984 | Anders | 138/112 |
| 4,896,701 | 1/1990 | Young | 138/108 |
| 5,069,255 | 12/1991 | Muszynski | 138/113 |

Primary Examiner—David Scherbel
Assistant Examiner—James F. Hook
Attorney, Agent, or Firm—Emrich & Dithmar

[57] ABSTRACT

A casing spacer includes first and second elongated, steel shell members comprised of stainless steel or high strength steel with corrosion inhibiting coatings, with each shell member having a semi-circular cross section for engaging and enclosing a carrier pipe within an outer casing. Attached to the outer surface of each of the first and second shell members are one or more adjustable risers for engaging the inner surface of the casing in maintaining the pipe, or pipes, in fixed position within the casing. Each riser includes a runner on its distal end to facilitate positioning of the spacer within the casing. The casing spacer's first and second shell members are securely coupled together by way of flange and nut and bolt combinations along one edge and a hook and eye arrangement along a second, opposed edge. The hook portion of one shell member is easily inserted in the eye portion of the second shell member followed by tightening of the nut and bolt combinations allowing a single worker to easily and quickly install the spacer about a carrier pipe and within a casing.

9 Claims, 3 Drawing Sheets

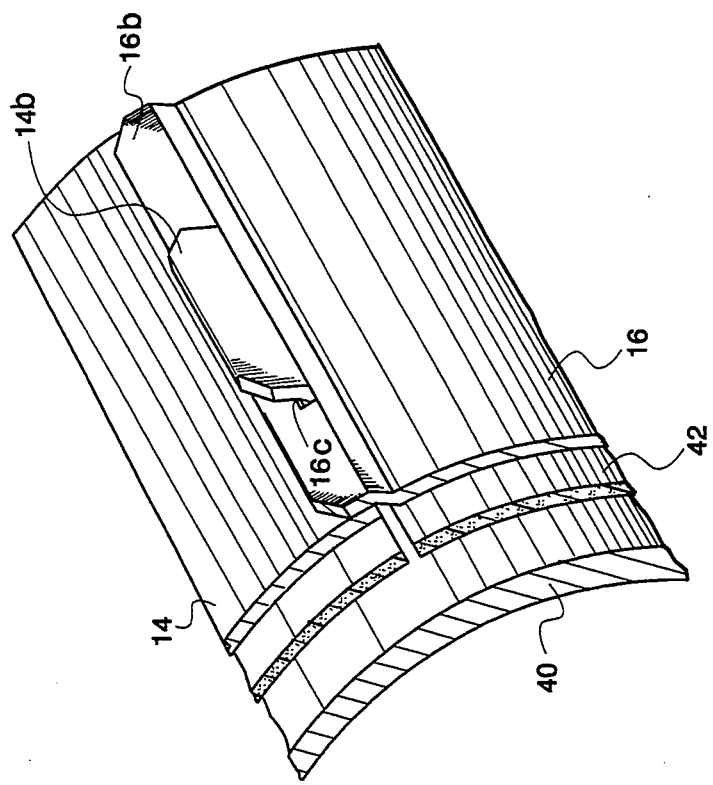
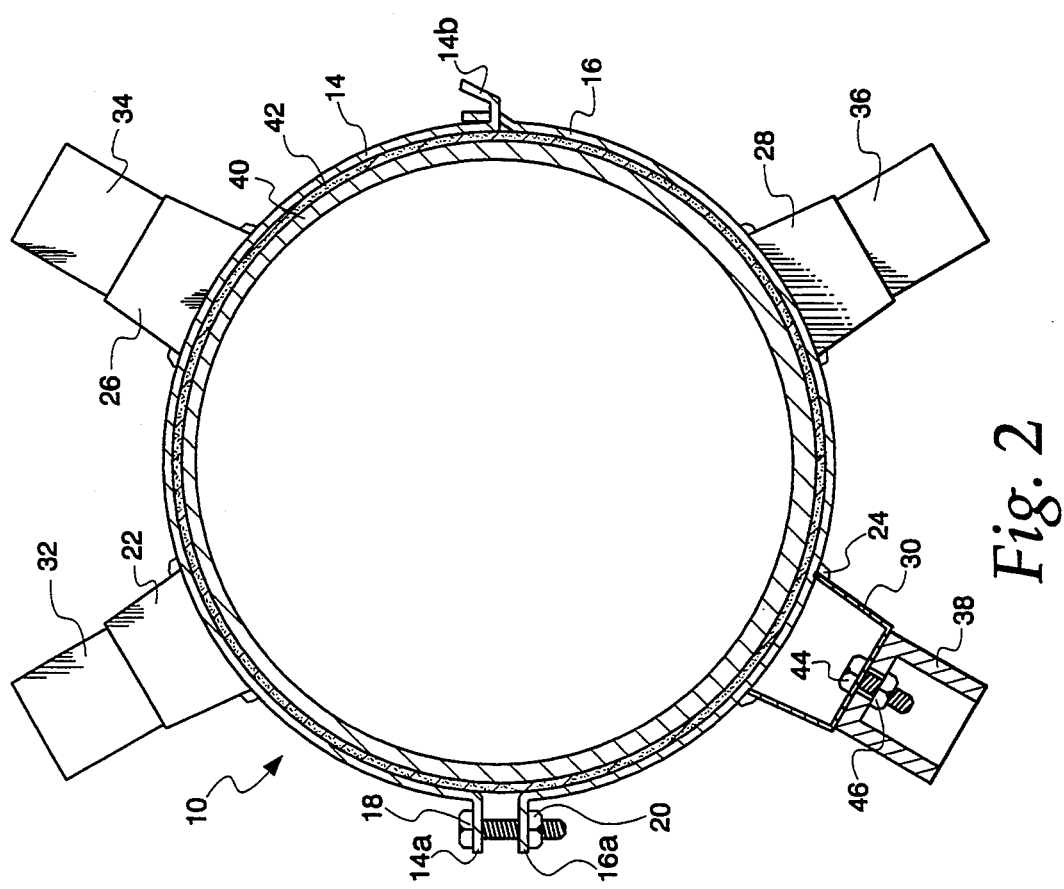

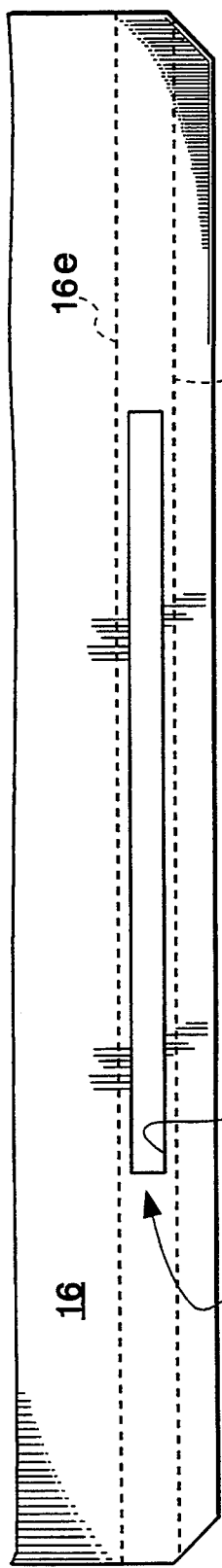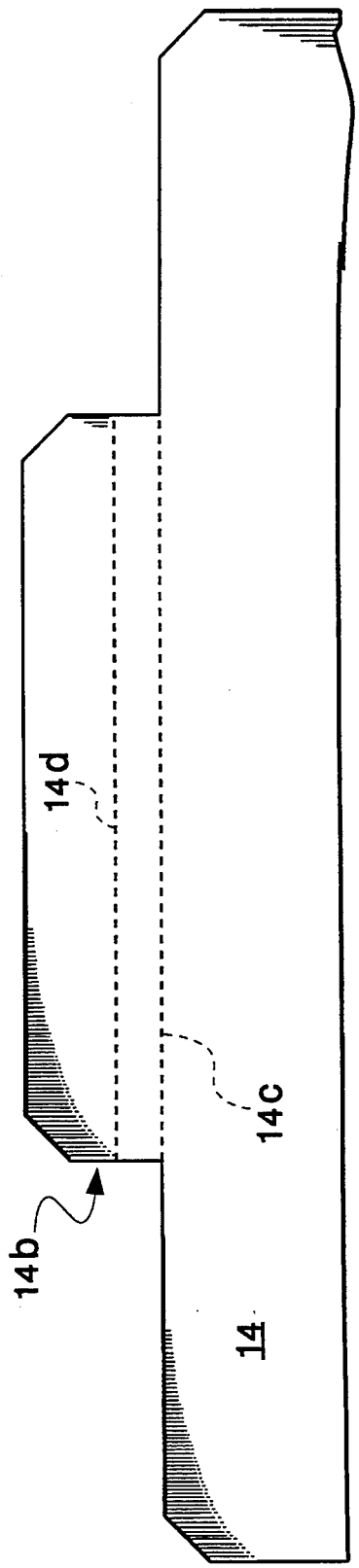

CASING SPACER

FIELD OF THE INVENTION

This invention relates generally to pipes for carrying a fluid material and is particularly directed to the positioning of a carrier pipe within an outer casing.

BACKGROUND OF THE INVENTION

In pipelines it is frequently necessary to position one or more pipes carrying a line medium within a rigid outer casing. This carrier pipe within an outer casing arrangement is frequently provided for water and sewer mains within highway and railroad crossing pipe casings to maintain carrier pipe alignment, restrain the carrier pipe against floatation or other movement, or maintain the carrier pipe in a fixed position and orientation such as per grade requirements in the case of a gravity sewer.

One prior approach to positioning a carrier pipe within an outer casing involves banding wooden skids to the outer periphery of the carrier pipe with steel straps. This approach requires at least two workers to attach the wooden skids to the carrier pipe, is cumbersome and time consuming, and frequently results in the catching of the wooden skids on weld beads resulting in rotation of the carrier pipe and destabilizing of its joints. Moreover, the wooden skids and steel straps are subject to breaking, making removal and reinstallation necessary. Back filling using sand or gravel is also employed to stabilize the carrier pipe, making subsequent removal such as for repair or rehabilitation even more difficult and expensive. A wet back fill produces a galvanic cell effect which promotes corrosion.

The banded wooden skids have generally been replaced by stainless steel casing spacers. These prior art casing spacers typically include upper and lower semi-circular shell members which are typically coupled together along their adjacent edges by means of a plurality of nut and bolt combinations inserted through flanges on the edges of the shell members. Disposed about the outer peripheries of the shell members are a plurality of spaced risers which maintain the carrier pipe in a fixed orientation and spaced position from the outer casing as well as from other pipes within the casing. While more easily installed and removed than the banded wooden skids described above, prior art steel casing spacers have also been cumbersome to install requiring two workers and a considerable amount of time.

The present invention addresses the aforementioned problems encountered in the prior art by providing a casing spacer which can be easily and quickly installed by a single worker which includes a unique coupling between the pair of shell members disposed about the carrier pipe.

OBJECTS AND SUMMARY OF THE INVENTION

Accordingly, it is an object of the present invention to facilitate the positioning of a carrier pipe within an outer casing.

It is another object of the present invention to provide a casing spacer for an inner carrier pipe which has a reduced number of components, can easily and quickly be installed by a single worker without special tools, and allows for adjusting the casing/carrier pipe spacing in the field.

Yet another object of the present invention is to provide a casing spacer for accurately and securely positioning a carrier pipe within an outer casing without the need for filler material or insertion lubricants.

This invention contemplates a casing spacer for positioning a carrier pipe within an outer casing, the casing spacer comprising: a first semi-circular shell member having a flange on a first lateral edge thereof; a second semi-circular shell member having a flange on a first lateral edge thereof; a hook portion disposed on a second, opposed lateral edge of the first shell member; an aperture adjacent a second, opposed lateral edge of the second shell member, wherein the aperture is adapted for receiving the hook portion for securely coupling the second lateral edges of the shell members when the shell members are disposed in tight fitting engagement about the carrier pipe; coupling means for securely connecting the flanges of the first and second shell members for maintaining the shell members disposed about and engaging the carrier pipe; and one or more risers attached to an outer surface of each of the shell members for engaging an inner surface of the casing in maintaining the carrier pipe in fixed position within and spaced from the outer casing.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a sectional view of the carrier pipe, casing spacer and outer casing combination shown in FIG. 1 taken along site line 2—2 therein;

FIG. 3 is a partial transverse sectional view of a portion of the casing spacer showing details of the manner in which the first and second shell members are coupled together;

FIG. 4 is a plan view of the "eye" portion of one of the casing spacer shell members; and FIG. 5 is a partial plan view of the "hook" portion of the second shell member which is adapted for coupling to the eye portion of the other shell member shown in FIG. 4.

DETAILED DESCRIPTION OF THE PREFERRED EMBODIMENT

Figure 1:
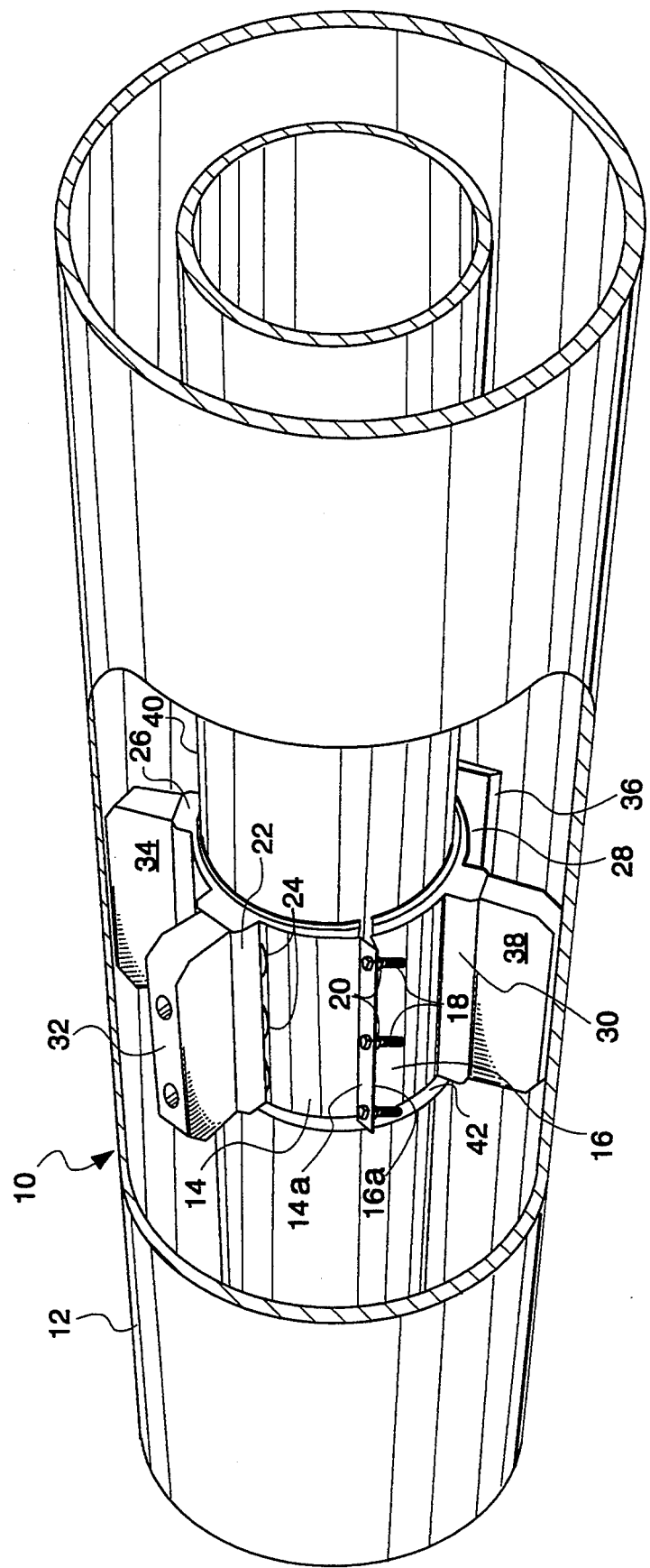
FIG. 1 is a partially cut away perspective view of a casing spacer disposed about a carrier pipe and within an outer casing in accordance with the present invention.

Referring to FIG. 1, there is shown a partially cutaway perspective view of a casing spacer 10 in accordance with the present invention disposed about a carrier pipe 40 and within an outer casing 12. Carrier pipe 40 and outer casing 12 each have a generally circular cross-section. Casing 12 is typically comprised of a high-strength steel, but may also be comprised of iron, concrete, fiberglass, plastics and other materials. Carrier pipe 40 may be comprised of steel, stainless steel, iron, concrete, fiberglass, asbestos/cement, plastics, or a combination of these and other materials.

Referring to FIG. 1 as well as to FIG. 2, which is a transverse sectional view of the carrier pipe and casing spacer combination, additional details of the inventive casing spacer 10 will now be described. A partial perspective view of a portion of the casing spacer and carrier pipe combination is shown in FIG. 3. Casing spacer 10 includes first and second semi-circular shell members 14 and 16, each preferably comprised of stainless steel, or painted or galvanized plated or epoxy coated steel. A vinyl liner 42 is positioned intermediate carrier pipe 40 and the first and second shell members 14, 16. A first lateral edge of the first shell member 14 is provided with a coupling flange 14a, while a first lateral edge of the second shell member 16 is similarly provided with a corresponding coupling flange 16a. Each of the coupling flanges 14a, 16a includes a plurality of spaced apertures therethrough for receiving a respective combination of a bolt 18 and nut 20. The nut and bolt combinations securely attach adjacent lateral edges of the first and second shell members 14, 16 when positioned about carrier pipe 40.

In accordance with the present invention, each of the first and second shell members 14, 16 is also provided with a second, opposed edge, which edges are securely coupled together in the following manner. The second edge of the first shell member 14 is provided with a hook portion 14b as shown in FIGS. 2 and 3 as well as in the partial plan view of the first shell member shown in FIG. 5. The second edge of the first shell member 14 is thus provided with a generally J-shaped configuration along a portion of its length by folding the shell member along fold lines 14c and 14d shown in dotted line form in FIG. 5. The eye portion 16b of the second shell member 16 is provided with an elongated, linear slot 16c. The eye portion 16b of the second shell member 16 is also folded along fold lines 16d and 16e shown in dotted line form in FIG. 4 so that the eye portion extends outwardly somewhat from the vinyl liner 42 to accommodate the thickness of the first shell member 14 and to receive the hook portion 14b of the first shell member. With the hook portion 14b of the first shell member 14 inserted through slot 16c in the eye portion 16b of the second shell member 16, the two shell members are securely coupled together along their respective adjacent edges. The opposing edges of each of the first and second shell members 14, 16 may then be securely coupled together along their respective coupling flanges 14a, 16a by means of the aforementioned nut and bolt combinations. The hook and eye assembly of the first and second shell members 14, 16 permits a single worker to easily and quickly install the casing spacer about carrier pipe 40 for insertion in outer casing 12.

Attached to the outer surface of the first shell member are first and second risers 22 and 26. Attached to the distal ends of the first and second risers 22, 26 are first and second runners 32 and 34, respectively. Each of the first and second risers 22, 26 is securely attached to the first shell member 14 by means of weldments 24 as shown for the case of the first riser 22 in FIG. 1. The first and second runners 32, 34 are preferably comprised of a rigid, strong material for supporting and positioning the casing spacer 10 and carrier pipe 40 within the outer casing 12 and further preferably have a relatively low coefficient of friction to facilitate sliding displacement of the casing spacer within the outer casing to facilitate installation and positioning of the casing spacer. This permits the casing spacer to be installed without special tools or lubricants. In the disclosed embodiment, runners 32, 34 are comprised of a plastic such as UHMW polymer.

Attached to the outer surface of the second member 16 are third and fourth risers 28 and 30. Attached to the distal ends of the third and fourth risers 28, 30 are third and fourth runners 36 and 38, respectively. The third and fourth risers 28, 30 are also securely attached to the second shell member 16 by weldments 24 as shown in FIG. 2. Also as shown in FIG. 2, a nut 46 and bolt 44 combination is used for attaching the runners to the risers as shown for the case of the fourth runner 38 attached to the fourth riser 30.

The casing spacer 10 typically is provided in two lengths of 8" and 12". The slot 16c in the eye portion 16b of the second, shell member 16 is preferably of sufficient length to accommodate the hook portion 14b in the first shell member 14. For an 8" casing spacer, the slot 16c in the eye portion 16b of the second shell member 16 is preferably 3.75" in length while the hook portion 14b in the first shell member 14 is preferably on the order of 3.62" in length. For the case of the 12 inch casing spacer, slot 16c is preferably on the order of 7.75" in length while the hook portion 14b is preferably on the order of 7.62" in length. As shown in FIG. 5, opposing corners of the hook portion 14b are beveled at a 45° angle or are provided with a radius to facilitate insertion of the hook portion within the slot 16c of the eye portion 16b.

There has thus been shown a casing spacer for positioning a carrier pipe within an outer casing which includes a reduced number of components and can be easily and quickly installed by a single worker. The casing spacer includes a plurality of runners preferably having good dielectric insulation characteristics to isolate the casing and carrier and inhibit galvanic corrosion, and be of an inert material to prohibit deterioration. The casing spacer includes first and second generally semi-circular shell members connected together along respected opposing edges by means of coupling flanges and nut and bolt combinations along adjacent first edges and a novel hook and eye assembly along adjacent second edges of the shell members. The hook and eye combination is first coupled together followed by attaching the nut and bolt combinations to the adjacent flanges of the shell members. The casing spacer is easily positioned about the carrier pipe and within the outer casing and allows for adjusting the position of the carrier pipe within the casing.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A casing spacer for positioning a carrier pipe carrying a fluid material within a unitary outer casing having a generally circular cross section, said casing spacer comprising:

a first semi-circular shell member having a flange on a first lateral edge thereof;

a second semi-circular shell member having a flange on a first lateral edge thereof;

a hook portion disposed on a second, opposed lateral edge of said first shell member;

means defining an aperture adjacent a second, opposed lateral edge of said second shell member, wherein said aperture is adapted for receiving said hook portion for securely coupling the second lateral edges of said shell members when said shell members are disposed in tight fitting engagement about the carrier pipe, wherein said aperture is elongated extending substantially the entire length of said second shell member and said hook portion extends substantially the entire length of said first shell member, and wherein said hook portion includes a generally flat, elongated section having beveled corners or having corners with a radius on opposed edges thereof;

coupling means for securely connecting the flanges of said first and second shell members for maintaining said shell members disposed about and engaging the carrier pipe;

one or more risers attached to an outer surface of each of said shell members for engaging an inner surface of the casing in maintaining the carrier pipe in fixed position within and spaced from the outer casing; and a plurality of runners each disposed on a distal end of a respective riser to facilitate insertion of said casing spacer into the outer casing.

2. The casing spacer of claim 1 wherein said first and second shell members each have a length on the order of 8", and wherein said aperture is on the order of 3.75" in length and said hook portion is on the order of 3.62" inches in length.

3. The casing spacer of claim 1 wherein said first and second shell members each have a length on the order of 12", and wherein said aperture is on the order of 7.75" in length and said hook portion is on the order of 7.62" in length.

4. The casing spacer of claim 1 wherein each of said flanges includes a plurality of spaced apertures, and wherein said coupling means includes a plurality of nut and bolt combinations inserted in said apertures.

5. The casing spacer of claim 1 further comprising a liner disposed intermediate the carrier pipe and said first and second shell members.

6. The casing spacer of claim 5 wherein said liner is comprised of vinyl.

7. The casing spacer of claim 1 wherein said first and second shell members are comprised of stainless steel or high strength painted, galvanized plated steel or epoxy coated steel.

8. The casing spacer of claim 1 wherein each of said runners is comprised of plastic.

9. The casing spacer of claim 8 wherein said plastic is UHMW polymer.

* * * * *